US006725240B1

(12) United States Patent
Asad et al.

(10) Patent No.: US 6,725,240 B1
(45) Date of Patent: Apr. 20, 2004

(54) APPARATUS AND METHOD FOR PROTECTING AGAINST DATA TAMPERING IN AN AUDIT SUBSYSTEM

(75) Inventors: Khalid A. Asad, Frederick, MD (US); Subodh A. Samuel, Reston, VA (US)

(73) Assignee: International Business Machines Corporation, Armonk, NY (US)

( * ) Notice: Subject to any disclaimer, the term of this patent is extended or adjusted under 35 U.S.C. 154(b) by 416 days.

(21) Appl. No.: 09/634,030

(22) Filed: Aug. 8, 2000

(51) Int. Cl.⁷ .............................................. G06F 17/30
(52) U.S. Cl. ......................................... 707/202; 714/20
(58) Field of Search ................................ 707/201–204; 714/20

(56) References Cited

U.S. PATENT DOCUMENTS

| | | | |
|---|---|---|---|
| 5,032,979 A | | 7/1991 | Hecht et al. ................. 364/200 |
| 5,412,801 A | * | 5/1995 | de Remer et al. ............ 714/20 |
| 5,485,608 A | * | 1/1996 | Lomet et al. ................ 707/202 |
| 5,561,795 A | * | 10/1996 | Sarkar ........................ 707/202 |
| 5,625,815 A | * | 4/1997 | Maier et al. .................... 707/8 |
| 5,689,243 A | | 11/1997 | Bianco .................... 340/825.3 |
| 5,737,600 A | * | 4/1998 | Geiner et al. ............... 707/200 |
| 5,740,433 A | * | 4/1998 | Carr et al. .................. 707/202 |
| 5,799,308 A | * | 8/1998 | Dixon ........................ 707/100 |
| 5,812,669 A | * | 9/1998 | Jenkins et al. .............. 713/161 |
| 5,862,318 A | * | 1/1999 | Habben ....................... 714/20 |
| 5,864,665 A | * | 1/1999 | Tran ........................... 713/155 |
| 5,872,844 A | | 2/1999 | Yacobi ......................... 380/24 |
| 5,877,961 A | * | 3/1999 | Moore ........................ 700/180 |
| 5,903,652 A | * | 5/1999 | Mital .......................... 705/26 |
| 5,951,695 A | * | 9/1999 | Kolovson .................... 714/16 |
| 5,956,404 A | * | 9/1999 | Schneier et al. ............. 380/30 |
| 5,970,143 A | * | 10/1999 | Schneier et al. ............ 380/251 |
| 5,978,475 A | * | 11/1999 | Schneier et al. ............ 713/164 |
| 6,014,673 A | * | 1/2000 | Davis et al. .................... 705/8 |
| 6,134,664 A | * | 10/2000 | Walker ........................ 713/201 |
| 6,161,198 A | * | 12/2000 | Hill et al. ...................... 714/15 |

OTHER PUBLICATIONS

"Secure Audit Logs to Support Computer Forensics", Bruce Schneier and John Kelsey, May 1999, ACM Transactions on Information and System Security, vol. 2, No. 2, pp. 159–176.*

"A Classification–based Methodology for Planning Audit Strategies in Fraud Detection", F. Bonchi, F. Giannotti, G. Mainetto, D. Pedreschi, 1999, ACM, pp. 175–184.*

"Secure Audit Logs to Support Computer Forensics", Bruce Schneier and John Kelsey, May 1999, ACM Transactions on Information and System Security, vol. 1, No. 2, pp. 159–176.*

"A Classification–based Methodology for Planning Audit Strategies in Fraud Detection", F. Bonchi, F. Giannotti, G. Mainetto, D. Pedreschi, 1999, ACM, pp. 175–184.*

"A Data Mining Framework for Buidling Intrusion Detection Models". Wenke Lee, Salvatore J. Stolfo, Kui W. Mok. Security and Privacy, 1999. Proceedings of the 1999 IEEE Symposium on, 1999. pp.: 120–132.*

* cited by examiner

*Primary Examiner*—Jack M. Choules
(74) *Attorney, Agent, or Firm*—Jeanine S. Ray-Yarletts; Carstens, Yee & Cahoon, LLP

(57) ABSTRACT

A data processing system and method stores a relational database in which audit records are stored without compromising the ability to detect data tampering. The technique provides for detection of unauthorized row modification, row deletion, and row insertion. Extra measures are incorporated to protect from administrator attacks. In addition, the technique enables integrity checking and audit log archiving without having to suspend or bring down the audit subsystem. These on-line capabilities are especially important in mission critical applications which must satisfy the requirement that the application be disabled if the audit subsystem is not functioning properly.

58 Claims, 9 Drawing Sheets server                     Figure 2

APPARATUS AND METHOD FOR PROTECTING AGAINST DATA TAMPERING IN AN AUDIT SUBSYSTEM

BACKGROUND OF THE INVENTION

1. Technical Field

The present invention relates to an improved data processing system and, in particular, to a method and apparatus for managing audit logs in a data processing system. Still more particularly, the present invention provides a method and apparatus for creating and verifying audit logs in a relational database without compromising the ability to detect data tampering in a data processing system.

2. Description of Related Art

Audit logs have long been used to keep permanent records of events. The audit log can be used at some future date to reconstruct events that happened in the past. This reconstruction might be required for legal, accounting, or security purposes or for recovery after a disaster.

Audit logs are more useful if the entries can be authenticated in some way. In paper systems, the physical log itself enforces this authentication. However, modern audit logs are often kept in digital files within a computer system. Such computer audit logs differ from paper documents in that they can be more easily modified undetectably. For example, it is easy to add, delete, or modify individual entries within an audit log in a computer system in such a way that the changes will go undetected. In fact, many computer hackers who break into computer systems take specific actions to modify the audit logs to erase all traces of their actions.

Computer security manufacturers have responded to this threat in several ways. One is to force the audit log to be continuously printed out on paper. Variants of this technique involve writing the audit log to a non-erasable medium, such as a CD-ROM. Another approach uses conventional computer security techniques to guard the audit log files. Such techniques include hiding and encrypting the log files or requiring special permissions to write to them. These techniques work well in some applications—most notably when the audit log is stored on a shared computer and the malicious person trying to modify the audit log does not have full permissions on that computer—but are not without their disadvantages. For example, clever hackers can often figure out ways around the computer security techniques and make changes to the audit log.

A common implementation approach for audit subsystems is to store audit records in a flat file. Such solutions are limited in terms of scalability, transaction support, sophisticated query capabilities, and recovery. Furthermore, they are not amenable to supporting on-line integrity checking or on-line archiving.

Therefore, it would be advantageous to have an improved method and apparatus for protecting against data tampering of audit logs.

SUMMARY OF THE INVENTION

The present invention solves the problems associated with the prior art by storing audit records in a relational database comprising a primary audit log table, auxiliary tables, and a system table. Audit record level protection is achieved by including an integrity column in every audit record and by assigning a unique identifier, such as a serial number, to each audit record. System level protection is achieved by maintaining serial number range and integrity information in the system table. The present invention provides for detection of unauthorized row modification, deletion, or insertion, and incorporates extra measures to protect against administrator attacks. Using the serial number range in the system table, a snapshot may be taken of the audit log to enable integrity checking and audit log archiving without having to suspend or bring down the audit subsystem.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
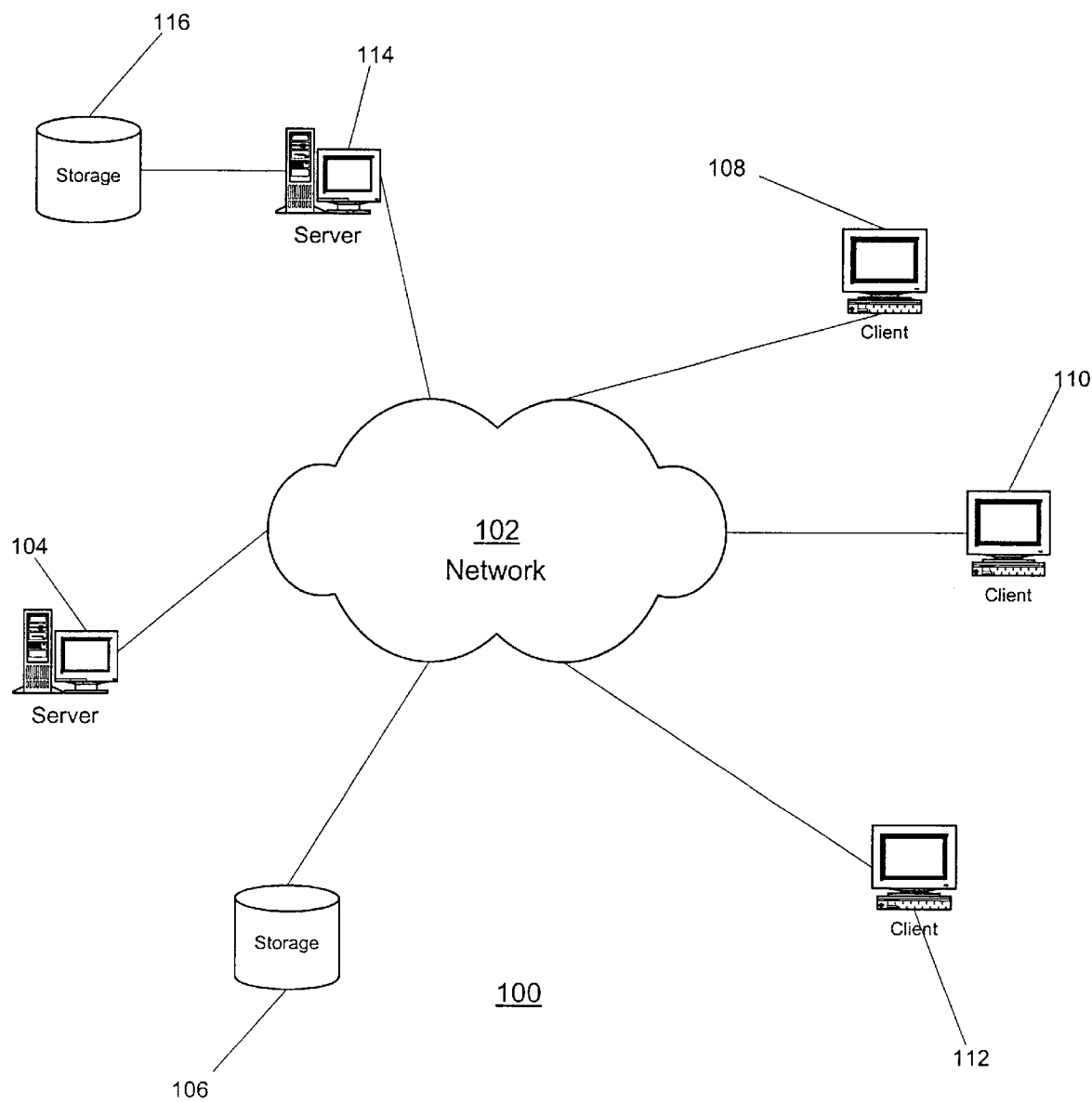
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. The example illustrated in FIG. 1 also includes a server 114 connected to network 102 and a storage unit 116 connected to server 114.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
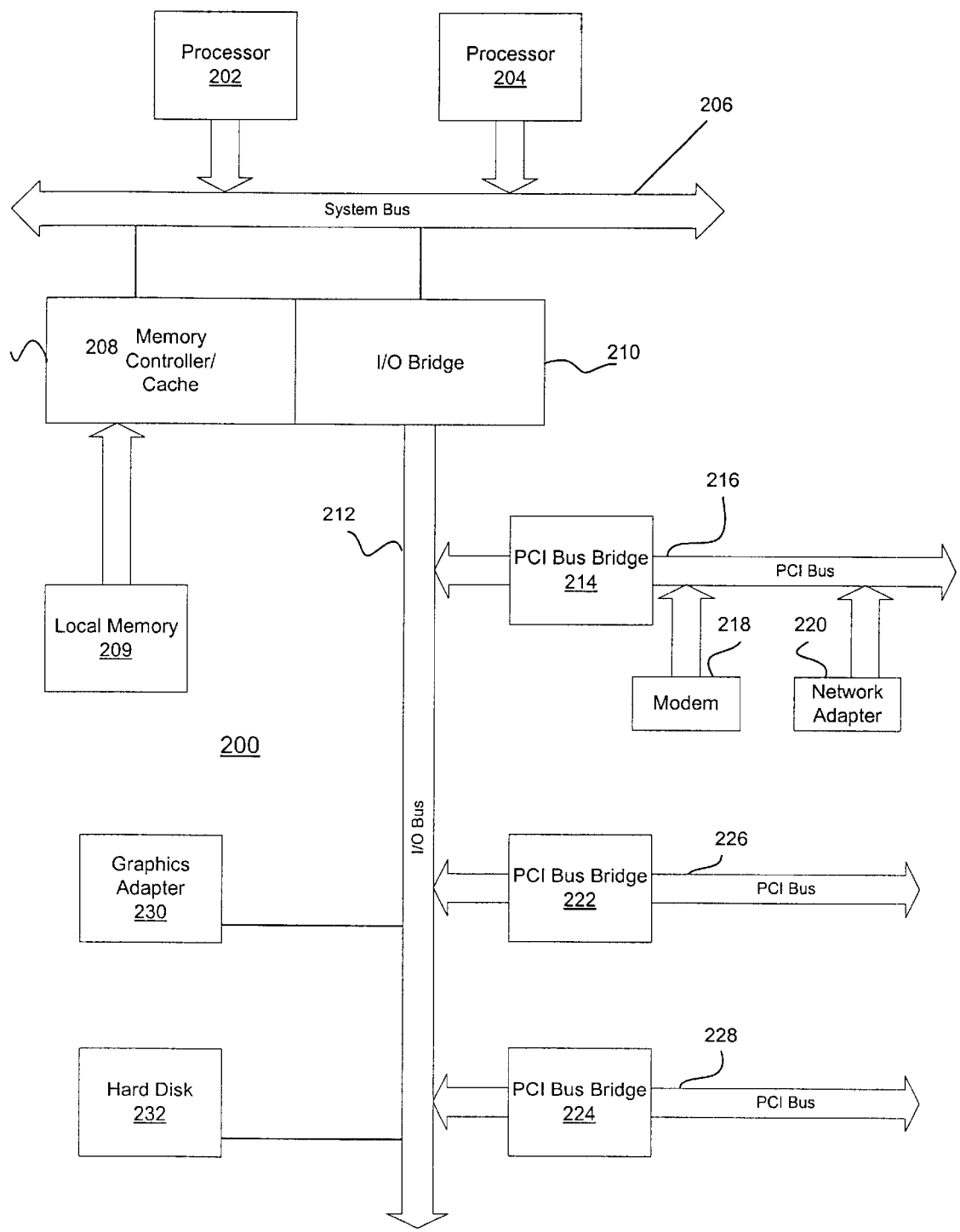
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

An operating system runs on processor 202 and is used to coordinate and provide control of various components within data processing system 200 in FIG. 2. The operating system may be a commercially available operating system, such as Windows 2000, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented operating system, and applications or programs are located on storage devices, such as hard disk drive 232, and may be loaded into main memory 209 for execution by processor 202.

Figure 3:
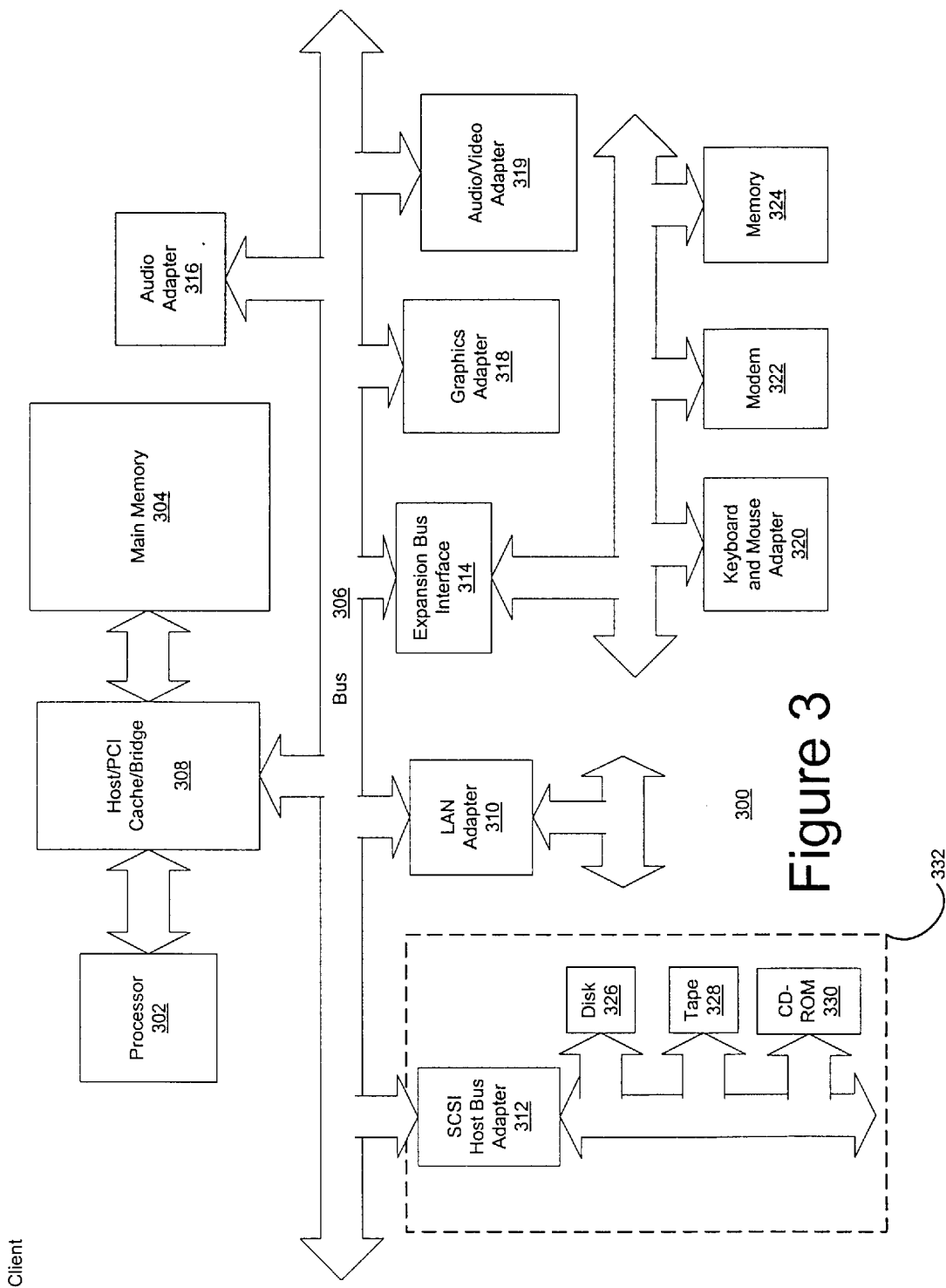
FIG. 3 is a block diagram illustrating a data processing system in which the present invention may be implemented.

With reference now to FIG. 3, a block diagram illustrating a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

Figure 4:
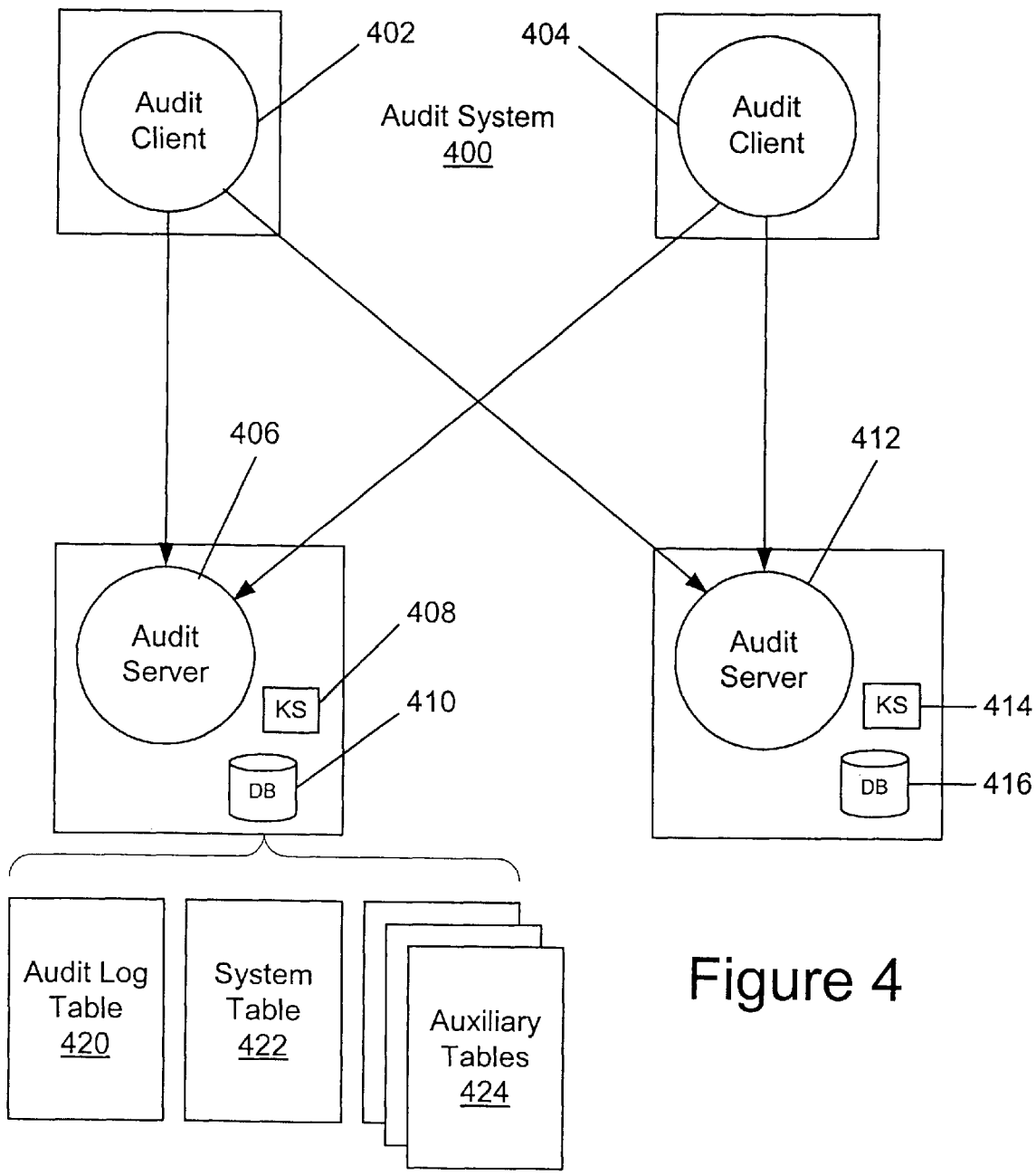
FIG. 4 is a client/server view of an exemplary audit subsystem of the present invention.

With reference now to FIG. 4, a client/server view of an audit subsystem is shown in accordance with a preferred embodiment of the present invention. The audit subsystem 400 includes audit clients 402, 404 connected to audit servers 406, 412. Audit clients 402, 404 are controlled by audit client software and audit servers 406, 412 are controlled by audit server software. In a preferred embodiment, the audit client software and audit server software is written in an objected-oriented programming language, such as Java. However, the software may be written in any known programming language.

Audit server 406 is connected to keystore 408 and database 410. Similarly, audit server 412 is connected to keystore 414 and database 416. A keystore represents a collection of keys and certificates.

Audit clients 402, 404 may be embodied on client computers within a network, such as clients 108–112 in FIG. 1. Audit servers 406, 412 may each be embodied on a network server, such as server 104 in FIG. 1. It will be understood that audit subsystem 400 may comprise any number of audit clients and any number of audit servers. Each client 402, 404 and each server 406, 412 may reside in a separate computer. Alternatively, a client and server, such as client 402 and server 406, may reside in a single computer. It will also be understood that the connectivity between clients and servers may be modified within the scope of the present invention. For example, audit client 404 may only be connected to audit server 412.

Audit clients 402, 404 monitor for events and send the events to audit servers 406, 412. The audit servers collect the events into the audit database. The audit servers also include utilities for ensuring the integrity of the audit database, as will be described below.

Audit database 410 includes a primary audit log table 420, a system table 422, and auxiliary tables 424. According to a preferred embodiment of the present invention, audit database 410 is a relational database, such as Database 2 (DB2) from IBM Corporation. A relational database is a database in which relationships between files are created by comparing data and by using indexes, which are built and maintained on key fields used for matching.

Each record in the audit log table has an integrity column, which is computed as the message authentication code (MAC) over the rest of the columns. A MAC is an authentication tag or checksum derived by application of an authentication scheme, together with a secret key, to a message. MACs are computed and verified with the same key. MACs can be categorized as (1) unconditionally secure, (2) hash function-based, (3) stream cipher-based, or (4) block cipher-based. Audit record modifications are detected by comparing the integrity column with a recomputed MAC over the remaining columns.

A keystore 414 is provided to store integrity information, such as keys or passwords, including the MAC key and any other keys or passwords related to integrity, and MAC values. Only the audit server and audit tools are able to compute MAC values, since they are the only code modules that have access to the keystore. The keystore checks that the calling code is trusted code and denies access to the contents of the keystore if the calling code is not trusted.

Examples of commonly used MACs include cipher block chaining message authentication code (CBC-MAC) and HMAC (short for "keyed-Hashing for Message Authentication"). CBC-MAC is a widely used U.S. and international standard. In CBC-MAC, the message blocks are encrypted using DES cipher block chaining and the final block in the ciphertext is output as the checksum. HMAC uses a key or keys in conjunction with a hash function to produce a checksum that is appended to the message.

Each record also has a unique serial number that increases monotonically with each new audit record. The serial number is used in aiding detection of row deletions and additions. After invoking a query to scan the audit records, a row deletion may be detected when a gap is encountered in the serial number sequence. Since the records are queried in ascending order and the serial numbers increase monotonically, a hole would occur if the serial number of the current audit record and the previous serial number plus one are not equal.

The system table 422 maintains the serial number of the first record in the audit log table (First_SN) and the serial number that will be assigned to the next audit record (Next_SN). When an audit record is inserted into the audit log table, the Next_SN value in the system table is updated and the audit record is inserted in the same transaction, so that the serial number range in the system table is always consistent with the set of current audit records. Any row whose serial number is outside the range of First_SN to Next_SN minus one is considered to be an extraneous record. A query of the audit log table for records outside the range may be invoked to isolate extraneous records for recording in an error log.

The system table also contains the integrity value of the auxiliary tables in the audit database. Similar to an audit record in the audit log table, the system table contains its own integrity column, which is computed as a MAC over the other columns. The integrity of the system table may be verified by recomputing the system table MAC and comparing it with the integrity column of the system table. The integrity of all the auxiliary tables may be verified by recomputing their respective MACs and comparing them with their corresponding values in the system table.

If all data were maintained in the database, a database administrator who is not authorized as an auditor could make modifications to the audit database without such changes being detectable. Such an attack may occur if (1) the database administrator gains access to the MAC key or (2) the database administrator mounts a database restore attack in which a restore operation is performed after some set of records have been inserted in the audit log.

To protect against the first type of attack, the MAC key is protected in a keystore, such as keystores 408, 414. The MAC key is triple data encryption standard (triple-DES) encrypted under a DES key derived from a password known by an individual acting as an auditor. This password is required to log into the keystore and subsequently gain access to any of the content of the keystore.

In addition, when a program attempts to access the contents of the keystore via the keystore application program interfaces (APIs), the keystore API logic authenticates the calling code. If the calling code is not trusted code, the APIs return failure codes and no access to data is granted. These techniques make it very difficult for an administrator, or any user for that matter, to gain access to the contents of the keystore.

To protect against the second type of attack, the first serial number, next serial number, and integrity columns from the system table are written to the keystore. Before verifying the integrity of the system table, the system table's integrity value, the first serial number, and the last serial number are compared with the corresponding values in the keystore file. If the next serial number in the system table is less than that in the keystore, then it is assumed that a database restore has been completed.

The above described technique for protection against DBA restore attacks is effective assuming that the DBA and the owner of the keystore file, typically an auditor, are not the same individual. If an enterprise defines a DBA role that is distinct from the auditor role, undetected tampering of the audit log via a restore attack is only possible if an individual acting as a DBA were to collude with an individual acting as an auditor.

Figure 5:
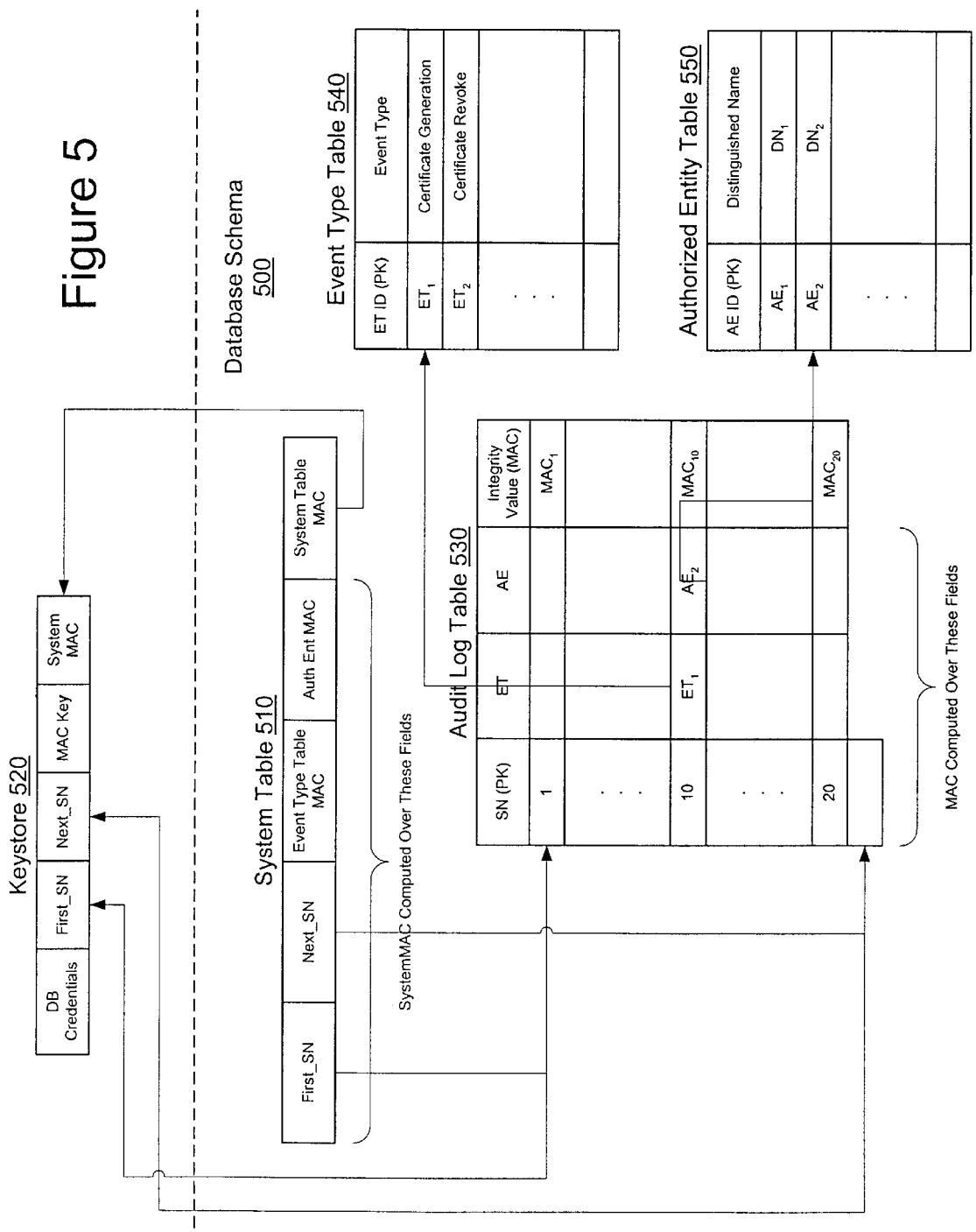
FIG. 5 illustrates a database schema in accordance with a preferred embodiment of the present invention.

With reference now to FIG. 5, a database schema is depicted in accordance with a preferred embodiment of the present invention. Database Schema 500 includes system table 510, audit log table 530, and auxiliary tables, particularly event type table 540 and authorized entity table 550. The system table 510 maintains the serial number of the first record in the audit log table (First_SN) and the serial number that will be assigned to the next audit record (Next_SN). The system table also contains the integrity value of other auxiliary tables in the audit database, particularly the event type table MAC and the authorized entity table MAC. The system table also contains its own integrity column, the system table MAC, which is computed as a MAC over the other columns. System table 510 may be embodied as system table 422 in FIG. 4.

The system table MAC is stored in keystore 520. The keystore also contains the MAC key to protect against a DBA attack. The first serial number (First_SN) and the next serial number (Next_SN) in the audit log table are also stored in the keystore. The keystore also stores database credentials. Keystore 520 may be embodied as one of keystores 408, 414 in FIG. 4.

Audit log table 530 includes a row for each event. The columns of audit log table 530 include serial number (SN), event type (ET), and authorized entity (AE). Each record in the audit log table also has an integrity column, which is computed as the MAC over the rest of the columns. The serial number column is populated with the Next_SN value from the system table when the audit record is created. The event type column is populated with an event type identification (ID) and the authorized entity column is populated with an authorized entity ID. In the example shown in FIG. 5, the audit record with SN equal to ten has an event type of $ET_1$ and an authorized entity of $AE_2$. The event type ID and the authorized entity ID are associated with an event type and distinguished name of the authorized entity, respectively, using lookup tables 540, 550, as discussed further below. Audit log table 530 may be embodied as audit log table 420 in FIG. 4.

Event type table 540 and authorized entity table 550 are examples of auxiliary tables that may be embodied in auxiliary tables 424 in FIG. 4. Each record in event type table 540 associates an event type ID with an event type. In the example shown in FIG. 5, event type ID $ET_1$ is associated with a "Certificate Generation" event. Event type ID $ET_2$ is associated with a "Certificate Revoke" event. Each record in authorized entity table 550 associates an authorized entity ID with distinguished name of an authorized entity. In the example shown in FIG. 5, authorized entity ID $AE_1$ is associated with distinguished name $DN_1$. Authorized entity ID $AE_2$ is associated with distinguished name $DN_2$. Therefore, the audit record in audit log table 530 with a SN equal to ten is a "Certificate Generation" event and the authorized entity is $DN_2$.

The database schema shown in FIG. 5 illustrates the advantages of the present invention discussed above. The audit log table 530 in conjunction with system table 510 protects against record insertion, deletion, and modification by use of the serial numbers and integrity column. The system table maintains the integrity of the auxiliary tables and stores the range of serial numbers of the audit records to allow an integrity check to be performed on-line. The keystore 520 protects against DBA attacks by storing the system table integrity value, the MAC key, and database credentials needed to access the audit database.

Those of ordinary skill in the art will appreciate that the structure of database schema 500 may vary depending on the implementation. The database may include fewer or, more likely, more tables and columns within the tables. For example, audit log table 530 may include additional columns each of which has an associated auxiliary table.

Figure 6:
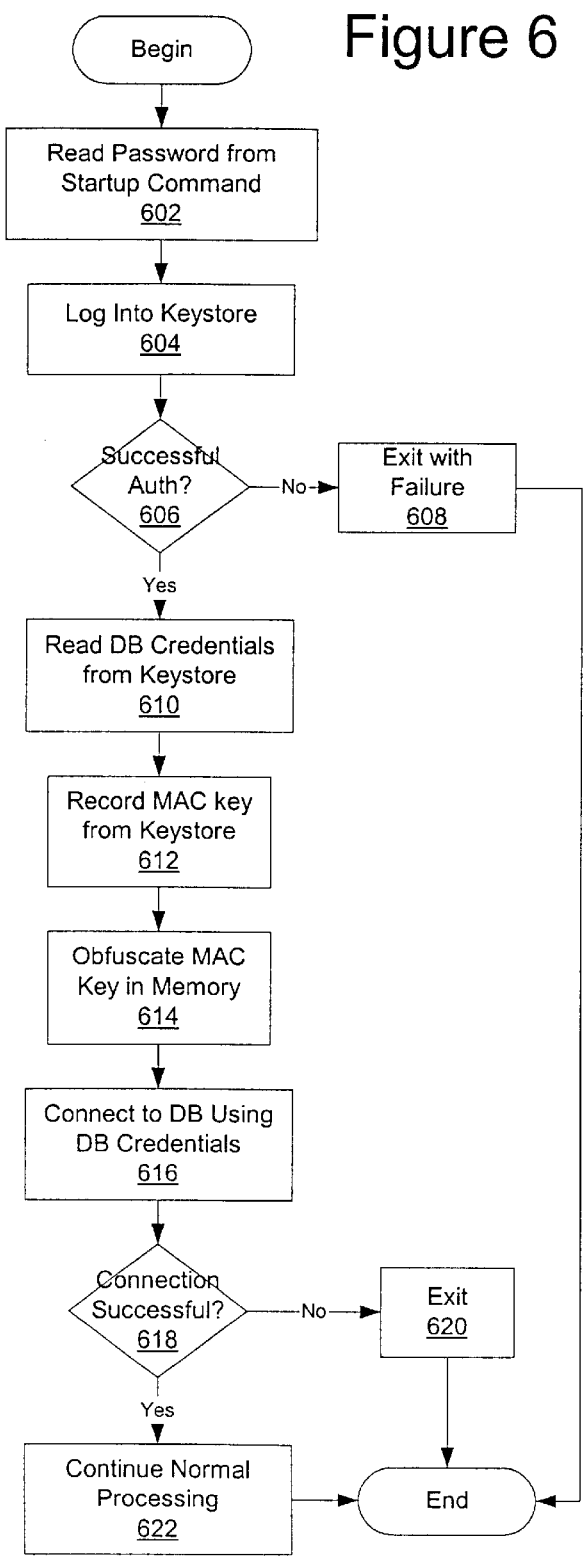
FIG. 6 is a flowchart, which illustrates an audit server or audit tool startup process in accordance with a preferred embodiment of the present invention.

With reference now to FIG. 6, a flowchart of an audit server or audit tool startup process is depicted in accordance with a preferred embodiment of the present invention. The process begins and reads a password from a startup command (step 602). The process allows the user to log into the keystore (step 604) and a determination is made as to whether authorization is successful (step 606). If authorization is not successful, the process exits with a failure (608) and the process ends.

If authorization is successful in step 606, the process proceeds to read database credentials from the keystore (step 610), record the MAC key from the keystore (step 612), and obfuscate the MAC key in memory (step 614). The process then attempts to connect to the database using the database credentials (step 616) and a determination is made as to whether the connection is successful (step 618). If connection is not successful, the process exits (step 620) and ends. If connection is successful in step 618, the process continues normal processing (step 622).

Figure 7:
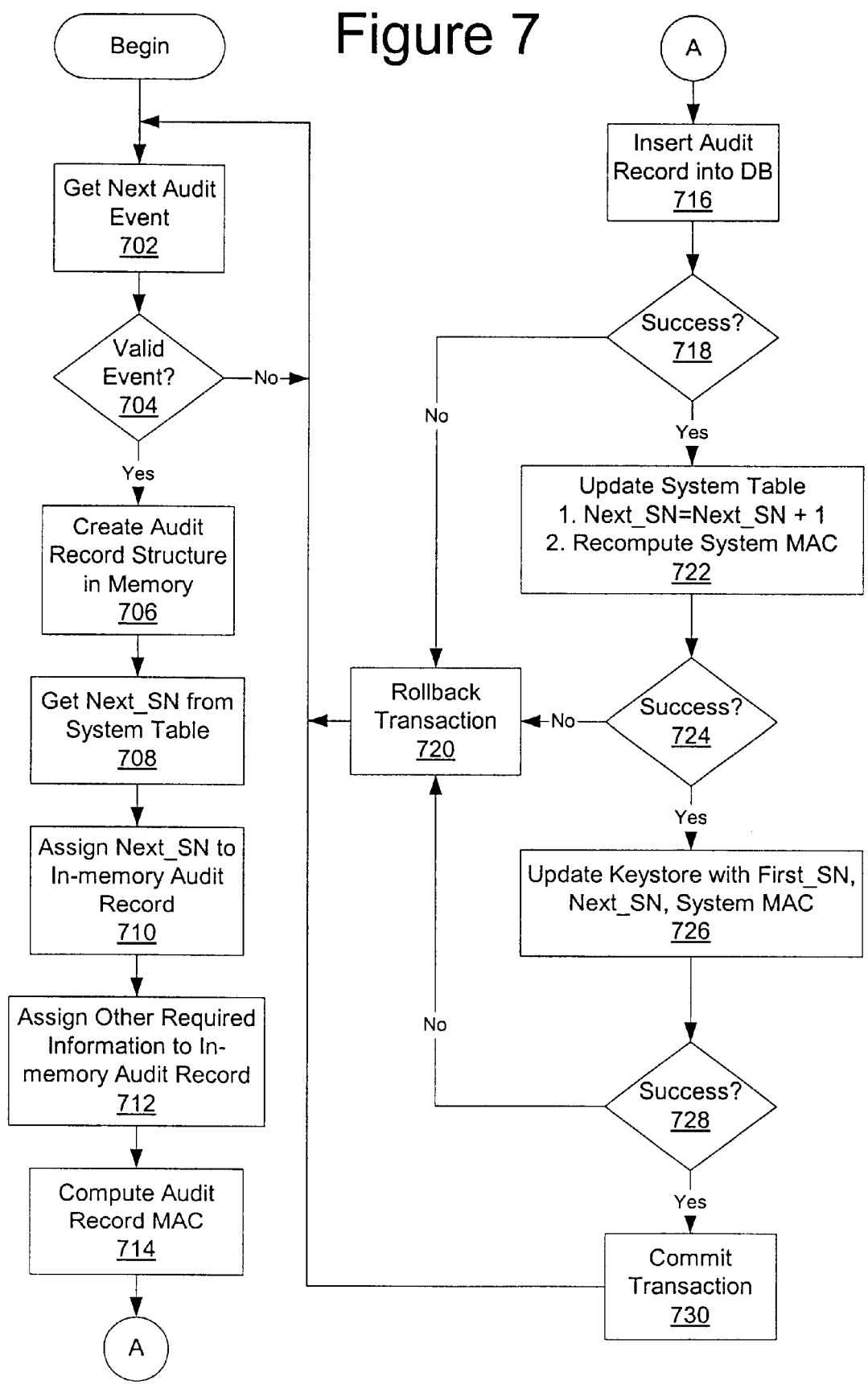
FIG. 7 is a flowchart, which illustrates an audit record creation process in accordance with a preferred embodiment of the present invention.

With reference now to FIG. 7, a flowchart of an audit record creation process is depicted in accordance with a preferred embodiment of the present invention. The audit record creation process begins following the startup sequence as shown in FIG. 6, gets the next audit event (step 702), and makes a determination as to whether the event is valid (step 704). If the event is a not a valid event, the client is notified and the process returns to step 702 to get the next record.

If the event is a valid event in step 704, the process creates an audit record structure in memory (step 706) and gets the Next_SN value from the system table (step 708). This locks the system table because of the database isolation level (COMMIT_READ) and blocks the archive utility. Thereafter, the process assigns Next_SN (step 710) and other required information (step 712) to the audit record in memory. Next, the process computes the audit record MAC (step 714), inserts the audit record into the database, and makes a determination as to whether the insertion is successful (step 718). If the insertion is not successful, the transaction is rolled back to the state before the process received the event (step 720) and the process returns to step 702 to get the next audit event and the audit client is notified of the failure.

If the insertion is successful in step 718, the system table is updated so that (1) Next_SN=Next_SN+1, and (2) the system MAC is recomputed (step 722). A determination is made as to whether the system table update is successful (step 724). If the system table update is not successful, the transaction is rolled back (step 720) and the process returns to step 702 to get the next audit event and the audit client is notified of the failure.

If the system table update is successful in step 724, the keystore is updated with First_SN, Next_SN, and system MAC values from the system table (step 726). A determination is made as to whether the keystore update is successful (step 728). If the keystore update is not successful, the transaction is rolled back (step 720) and the process returns to step 702 to get the next audit event and the audit client is notified of the failure. If the keystore update is successful, the process commits the transaction (step 730) and returns to step 702 to get the next audit event.

Figure 8:
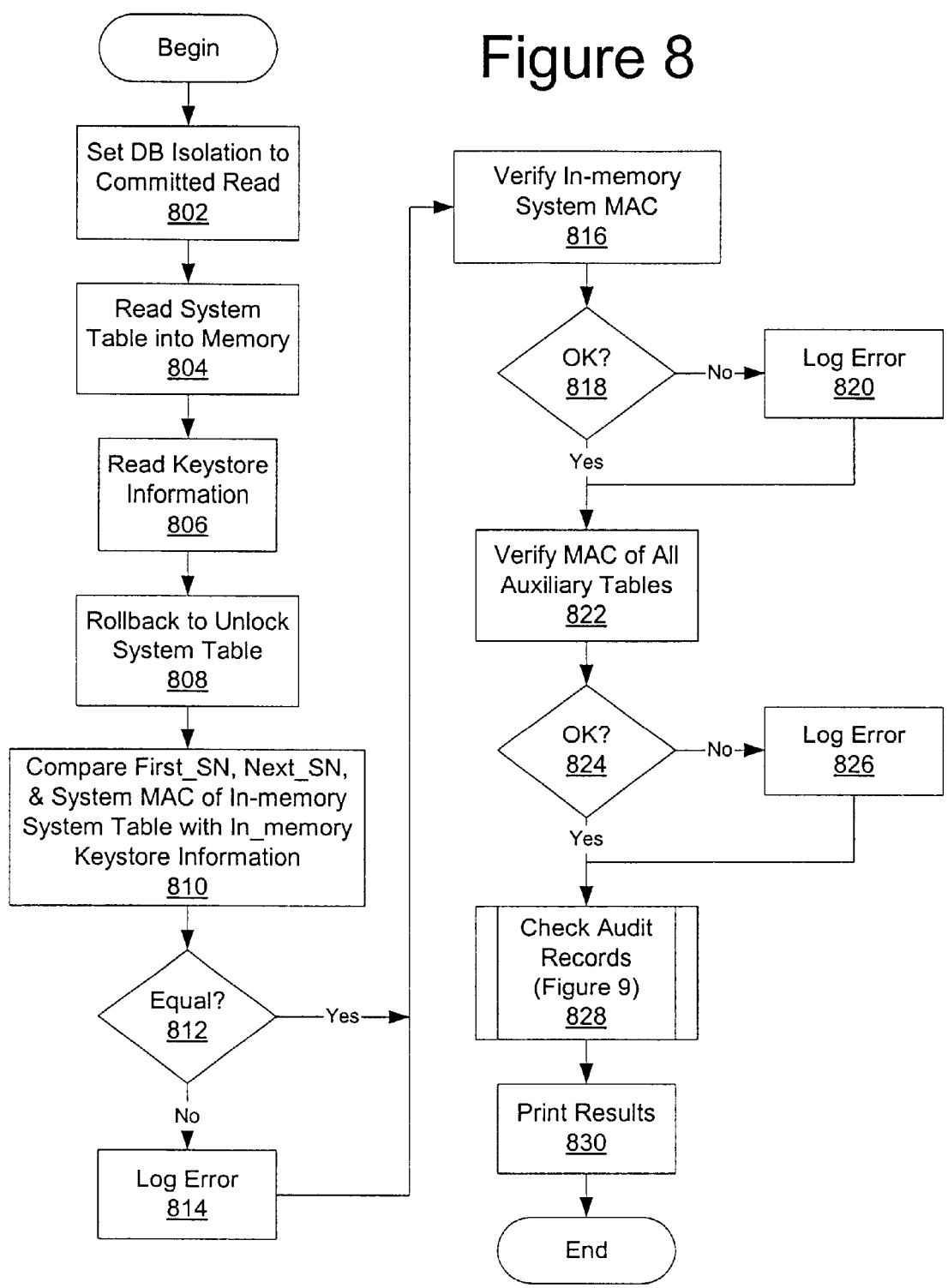
FIG. 8 is a flowchart, which illustrates an integrity check utility in accordance with a preferred embodiment of the present invention.

With reference now to FIG. 8, an integrity check utility process is depicted in accordance with a preferred embodiment of the present invention. The process begins following the startup sequence shown in FIG. 6, sets database isolation level to committed read (step 802) and reads the system table into memory (step 804). The row is locked because of database isolation level and inserts are blocked. The process then reads keystore information (step 806) and performs a rollback to unlock the system table (step 808). The rollback to unlock the system table unblocks inserts.

Thereafter, the process compares First_SN, Next_SN, and system MAC values of the system table in memory with the keystore information in memory (step 810). A determination is made as to whether the values are equal (step 812). If the values are not equal, the process logs the error (step 814) and verifies the system MAC in memory (step 816). If the values are equal in step 812, the process proceeds directly to step 816 to verify the system MAC in memory.

A determination is made as to whether the system MAC in memory is verified (step 818) by recomputing the MAC using the MAC key and comparing the recomputed value with the value read from the system table. If the system MAC is not verified, the process logs the error (step 820) and verifies the MACs of all auxiliary tables (step 822). If the system MAC is verified in step 818, the process proceeds directly to step 822 to verify the MACs of all auxiliary tables.

A determination is made as to whether the MACs of all the auxiliary tables are verified (step 824) by recomputing the auxiliary table MACs using the MAC key and comparing the recomputed value with the values read from the system table. If the MAC of any of the auxiliary tables is not verified, the process logs the error (step 826) and executes an audit record check process (step 828). If the MACs of all the auxiliary tables are verified in step 824, the process proceeds directly to step 828 to execute the audit record check process. The detailed operation of the audit record check process according to a preferred embodiment of the present invention will be described in more detail below with respect to FIG. 9. After the process executes the audit record check process, results are printed (step 830) and the process ends.

Figure 9:
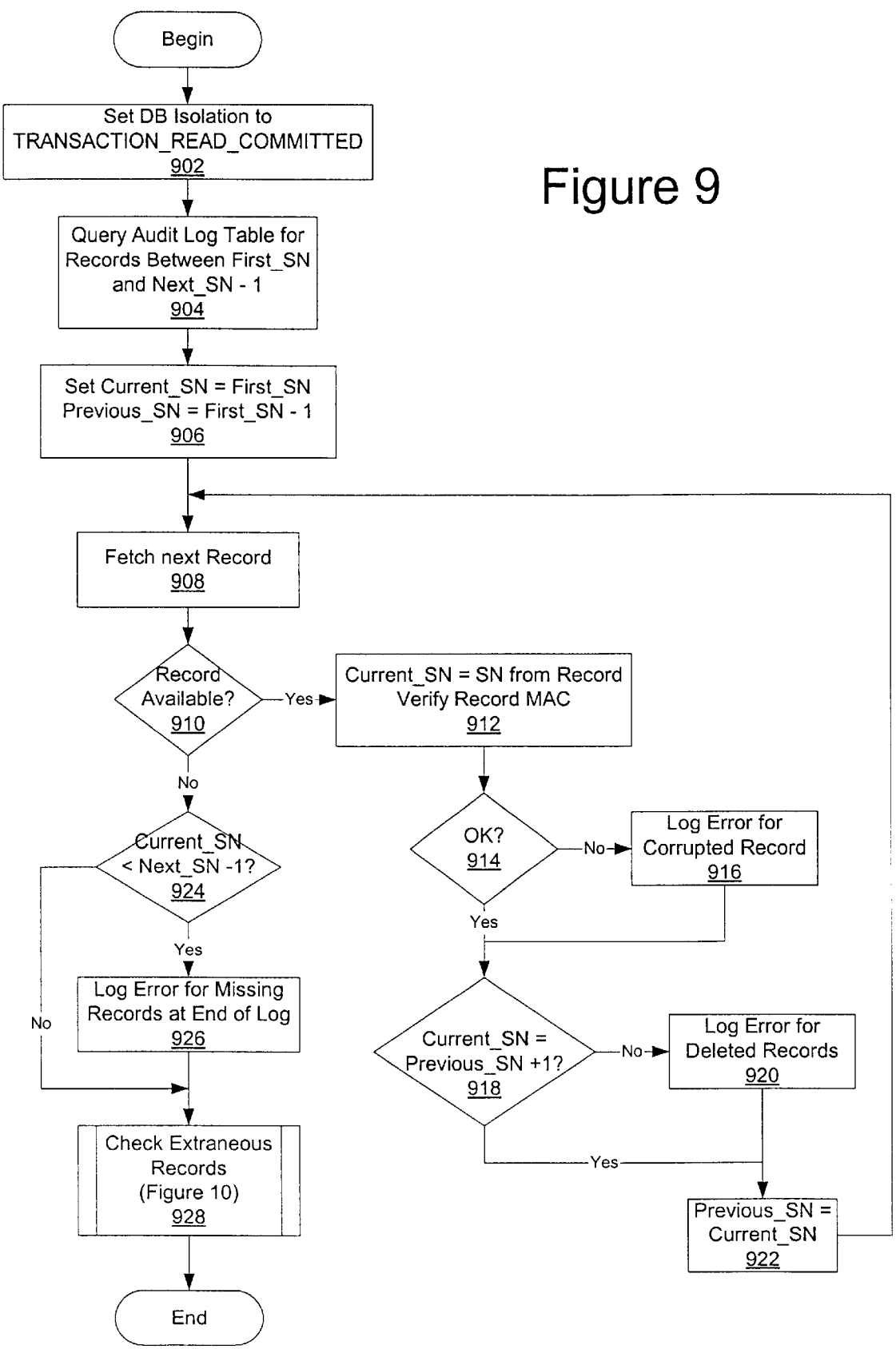
FIG. 9 is an audit record checking utility in accordance with a preferred embodiment of the present invention.

With reference now to FIG. 9, an audit record checking utility process is shown in accordance with a preferred embodiment of the present invention. The process begins, sets database isolation level to TRANSACTION_READ_COMMITTED (step 902). This isolation level releases the shared lock on the current row when the next record is read, so that a large number of records is not locked. Next, the process queries the audit log table for records between First_SN and Next_SN−1 (step 904). The process then sets a variable Current_SN to be equal to First_SN and Previous_SN to be equal to First_SN−1 (step 906). Thereafter, the process fetches the next record from the query results (step 908). A determination is made as to whether the record is available (910).

If the record is available, the value of Current_SN is set to be equal to the serial number from the fetched record. The process verifies the MAC for the record (step 912). A determination is made as to whether the MAC is verified (step 914) by recomputing the MAC using the MAC key and comparing the recomputed value with the value read from the integrity column. If the MAC is not verified, the process determines that the record has been modified and logs an error for corrupted record (step 916) and then determines whether Current_SN is equal to Previous_SN+1 (step 918). If the MAC is verified in step 914, the process proceeds directly to step 918.

If Current_SN is not equal to Previous_SN+1 in step 918, the process has found a gap in the serial numbers and logs an error for deleted records (step 920). The process then sets Previous_SN to be equal to Current_SN (step 922) and returns to step 908 to fetch the next record. If Current_SN is equal to Previous_SN+1, then no gap is found and the process sets Previous_SN to be equal to Current_SN (step 922) and returns to step 908 to fetch the next record.

With reference again to step 910, if the record is not available, a determination is made as to whether Current_SN is less than Next_SN−1 (step 924). If Current_SN is less than Next_SN−1, then the process determines that the record to be fetched is in the range of event records that are supposed to be in the audit log table. Therefore, since the record is not available, the record is missing and the process logs an error for missing records at the end of the log (step 926), executes a check extraneous records process (step 928), and ends.

If records have been deleted, the audit record checking utility will detect this because of gaps in the audit record serial numbers. The issue is that the audit record checking utility will detect this every time without a capability whereby an auditor running the tool can "patch" the audit log so that previously reported deleted records will not be reported again. In a preferred embodiment, the auditor may insert dummy records using the audit record checking utility. The inserted dummy records would be MAC'd liked other records and would have appropriate content to enable the auditor to get a later report on deleted records. At the same time, since the serial number gaps would be closed, the audit record checking utility would only report recent deletions or those for which the auditor has not patched in dummy records.

If Current_SN is not less than Next_SN−1 in step 924, then the process determines that the end of the log has been reached. Thus, the process proceeds directly to step 928 to execute a check extraneous records process and ends. The detailed operation of the check extraneous records process according to a preferred embodiment of the present invention will be described in more detail below with respect to FIG. 10.

The above described design for system level protection exploits the fact that each audit record has a unique serial number that increases monotonically. The first serial number and the next serial number are maintained in the system table. By maintaining these values in a separate table, it is possible to take a snapshot of the audit database at any given time.

The integrity check utility takes a snapshot of the audit log based upon the serial number range in the system table and performs an integrity check on the records using the previously described process. The system table is locked in shared mode for the duration of the read and released immediately. This allows the audit subsystem to continue inserting rows while the integrity check utility is executing.

Figure 10:
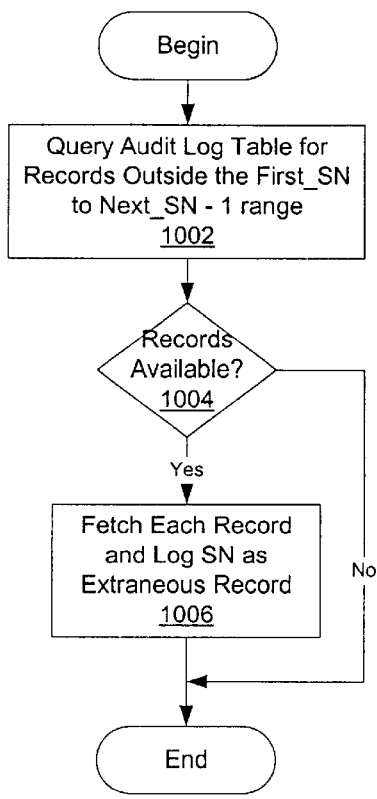
FIG. 10 is an extraneous record checking utility in accordance with a preferred embodiment of the present invention.

With reference now to FIG. 10, an extraneous record checking utility process is shown in accordance with a preferred embodiment of the present invention. The process begins and queries the audit log table for records outside the First_SN to Next_SN–1 range (step 1002). A determination is made as to whether records outside the range are available (step 1004). If records outside the range are available, the process fetches each record and logs the serial number as an extraneous record (step 1006). Next, the process ends. If records outside the range are not available in step 1004, the process ends.

If the integrity check fails due to row modification, deletion, or insertion, the offending rows must be reported and an authorized administrator, typically an auditor, must be given an opportunity to inspect these rows. Once an administrator has taken action on the offending rows, they must be marked as having been inspected; otherwise, the integrity check utility will continue to report integrity failures. In a preferred embodiment of the present invention, the set of offending serial number ranges is stored in a separate table. The MAC of this table is stored in the system table. This MAC is protected under the system level MAC, so that data tampering of the "inspected" serial number ranges will be detected. In an alternate embodiment, the serial number ranges may be stored in the keystore.

Since the audit records are never deleted by any application, the audit log table can grow significantly over time. Audit records generated five years ago may no longer be required to be online. For this purpose, the audit subsystem provides a mechanism to archive and purge audit records. The records are archived to files and signed using an audit signing key. Archived records can be brought online for viewing purposes. Online archiving is accomplished using the snapshot mechanism described above allowing archival of records to be done at the same time new audit records are being inserted into the audit log.

The present invention provides an improved method and apparatus for protecting against data tampering of audit logs. Audit records are stored in a table in a relational database. Each record is assigned a unique serial number, which increases monotonically. The serial number is used in aiding the detection of row deletions and additions. Record modification is detected by computing a message authentication code over each record to verify the integrity of the record. The present invention protects against database administrator attacks by the use of a keystore.

It will be apparent to those of ordinary skill in the art that modifications may be made to the above described embodiments within the scope of the present invention. For example, while the audit records are described as being stored in a database table and having a unique, monotonically increasing serial number, the audit records may be stored in another data structure. The audit records may also be assigned some other identifier that maintains the order of the records. For instance, each record may be assigned a pointer to the next audit record in sequence. As another example of modifications that may be made to the embodiments described herein, the MAC value for each audit record may be computed over a smaller subset of columns (e.g., every other column), rather than the remaining columns in each record.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for protecting against data tampering in a audit subsystem in a data processing system, comprising:

creating an audit log data structure and a system data structure;

assigning a unique serial number to each record in the audit log data structure, the unique serial number increasing monotonically with each new audit record;

storing in the system data structure a first serial number value corresponding to the serial number of the first audit record and a next serial number value corresponding to the next serial number to be assigned in the audit log data structure;

calculating a system integrity value for the system data structure; and storing the system integrity value in the system data structure.

2. The method of claim 1, wherein the system integrity value comprises a system message authentication code computed for at least one other data item in the system data structure.

3. The method of claim 1, further comprising:

creating a keystore; and storing integrity information in the keystore.

4. The method of claim 3, wherein the keystore has associated therewith a password and the integrity information is encrypted using a key derived from the password.

5. The method of claim 3, wherein the integrity information includes a key.

6. The method of claim 5, further comprising:

wherein the system integrity value for the system data structure is calculated using the key system.

7. The method of claim 6, wherein the step of storing integrity information in the keystore comprises storing the system integrity in the keystore.

8. The method of claim 6, wherein the system integrity value comprises a system message authentication code computed for at least one other data item in the system data structure.

9. The method of claim 5, further comprising:
computing for each record in the audit data structure an audit record integrity value using the key.

10. The method of claim 9, wherein the audit record integrity value comprises an audit record message authentication code computed for at least one other data item in the audit record.

11. The method of claim 3, wherein the integrity information includes the first serial number value and the next serial number value.

12. The method of claim 3, wherein the audit log structure and the system data structure are stored as tables in an audit database.

13. The method of claim 12, wherein the integrity information includes database credentials for the audit database.

14. The method of claim 3, wherein the keystore determines whether calling code is trusted code.

15. The method of claim 14, wherein the keystore allows access to the contents of the keystore in response to a determination that the calling code is trusted code.

16. The method of claim 1, further comprises:
computing for each record in the audit log data structure an audit record integrity value; and
storing each audit record integrity value in the corresponding audit record.

17. The method of claim 16, wherein the audit record integrity value comprises an audit record message authentication code computed for at least one other data item in the audit record.

18. The method of claim 1, wherein the audit log data structure and the system data structure are stored as tables in an audit database.

19. The method of claim 18, wherein the audit database is a relational database.

20. The method of claim 18, wherein the audit database further comprises at least one auxiliary table and the system table stores an integrity value for each of the at least one auxiliary table.

21. A method for creating an event record in an audit subsystem in a data processing system, comprising:
creating a new record in an audit log data structure;
receiving a next serial number value from a system data structure;
storing the next serial number value in the new record of the audit log data structure;
incrementing the next serial number value in the system data structure;
calculating an integrity value for the new record of the audit data structure; and
storing the integrity value in the new record of the audit log data structure;
calculating a system integrity value for the system data structure; and
storing the system integrity value in the system data structure.

22. The method of claim 21, further comprising updating the next serial number value and system integrity value in a keystore.

23. The method of claim 21, wherein the audit log structure and the system data structure are stored as tables in the audit structure.

24. The method of claim 23, wherein the audit database is a relational database.

25. A method for performing an on-line integrity check of an audit subsystem in a data processing system, comprising:
logging into a keystore;
receiving database credentials from the keystore;
accessing an audit database using the database credentials, wherein the audit database includes an audit log table;
querying the audit log table for a range of serial numbers;
receiving a results table of audit records in response to the query; and
performing an integrity check on the audit records in the results table.

26. The method of claim 25, wherein the step of performing an integrity check on the results table comprises determining whether an audit record has been modified.

27. The method of claim 26, wherein the step of determining whether an audit record has been modified comprises:
receiving an integrity value for the audit record;
recomputing the integrity value; and
comparing the received integrity value and the recomputed integrity value.

28. The method of claim 25, wherein the step of performing an integrity check on the results table comprises determining whether an audit record has been deleted.

29. The method of claim 28, wherein the step of determining whether an audit record has been deleted comprises:
examining the serial numbers of the audit records in the results table; and
identifying a pair of successive audit records that do not have monotonically increasing serial numbers.

30. The method of claim 28, wherein the step of determining whether an audit records has been deleted comprises:
determining whether an audit record is missing at the end of the audit log table.

31. The method of claim 25, wherein the step of querying the audit log table for a range of serial numbers comprises querying the audit log table for records outside the range and wherein the step of performing an integrity check on the results table comprises identifying each record in the results table as an extraneous record.

32. The method of claim 25, wherein the audit database includes a system table that stores integrity information for the audit log table, the method further comprising determining whether the system table has been modified.

33. The method of claim 32, wherein the step of determining whether the system table has been modified comprises:
receiving an integrity value for the system table;
recomputing the integrity value; and
comparing the received integrity value and the recomputed integrity value.

34. The method of claim 32, wherein the integrity information includes an integrity value for the system table and the integrity information is stored in the keystore, the step of determining whether the system table has been modified comprises:
receiving the integrity information form the keystore;
receiving the integrity information from the system table; and comparing the integrity information received from the keystore with the integrity information received from the system table.

35. The method of claim 25, wherein a system table stores integrity information for an auxiliary table, the method further comprising determining whether the auxiliary table has been modified.

36. The method of claim 35, wherein the step of determining whether the auxiliary table has been modified comprises:
   receiving an integrity value for the auxiliary table from the system table;
   recomputing the integrity value; and
   comparing the received integrity value and the recomputed integrity value.

37. An apparatus for protecting against data tampering in an audit subsystem in a data processing system, comprising:
   means for creating an audit log data structure and a system data structure;
   means for assigning a unique serial number to each record in the audit log data structure, the unique serial number increasing monotonically with each new audit record; and
   means for storing in the system data structure the first serial number and the next serial to be assigned;
   means for calculating a system integrity value for the system data structure; and
   means for storing the system integrity value in the system data structure.

38. The method of claim 37, further comprising:
   means for creating a keystore; and
   means for storing integrity information in the keystore.

39. The method of claim 38, wherein the integrity information includes the system integrity value.

40. The method of claim 38, wherein the system integrity value comprises a system message authentication code computed for at least one other data item in the system data structure.

41. The method of claim 37, further comprising:
   means for computing for each record in the audit log data structure an audit record integrity value; and
   means for storing each audit record integrity value in the corresponding audit record.

42. The method of claim 41, wherein the audit record integrity value comprises an audit message authentication code computed for at least one other data structure are stored as tables in an audit database.

43. The method of claim 37, wherein the audit log data structure and the system data structure are stored as tables in an audit database.

44. The method of claim 43, wherein the audit database is a relational database.

45. The apparatus of claim 43, wherein the audit database further comprises at least one auxiliary table and the system table stores an integrity value for each of the at least one auxiliary table.

46. An apparatus comprising:
   a processor; and
   a memory electrically connected to the processor, the memory having stored therein a program to be executed on the processor for performing the following steps:
   creating a new record in an audit log data structure;
   receiving a next serial number value from a system data structure;
   storing the next serial number value in the new record of the audit log data structure;
   increasing the next serial number value in the system data structure;
   calculating an integrity value for the new record of the audit log data structure;
   storing the integrity value in the new record of the audit data structure;
   calculating a system integrity value for the system data structure; and
   storing the system integrity value in the system data structure.

47. An apparatus comprising:
   a processor; and
   a memory electrically connected to the processor, the memory having stored therein a program to be executed on the processor for performing the following steps:
   logging into a keystore;
   receiving database credentials from the database credentials, wherein the audit database includes an audit log table;
   querying the audit log table for a range of serial numbers;
   receiving a results table of audit records in response to the query; and
   performing an integrity check on the audit records in the results table.

48. The apparatus of claim 47, wherein the step of performing an integrity check in the results table comprises determining whether an audit record has been modified.

49. The apparatus of claim 48, wherein the step of determining whether an audit record has been modified comprises:
   receiving an integrity value for the audit record;
   recomputing the integrity value; and
   comparing the received integrity value and the recomputed integrity value.

50. The apparatus of claim 47, wherein the step of performing an integrity check on the results table comprises determining whether an audit record has been deleted.

51. The apparatus of claim 50, wherein the step of determining whether an audit record has been deleted comprises:
   examining the serial numbers of the audit records in the results table; and
   identifying a pair of successive audit records that do not have monotonically increasing serial numbers.

52. The apparatus of claim 47, wherein the step of querying the audit log table for a range of serial numbers comprises querying the audit log table for records outside the range and wherein the step of performing an integrity check on the results table comprises identifying each record in the results table as an extraneous record.

53. An audit system comprising:
   an audit client; and
   an audit server for receiving audit events from the audit client, the audit server having an audit database, wherein the audit database includes an audit log table for storing an audit event record for each received audit event and a system table for storing integrity information for the audit database, and a keystore, wherein the keystore stores database credentials for the audit database.

54. A data structure embodied on a computer readable medium comprising:
   an audit database comprising an audit log table for storing audit event records, at least one auxiliary table, and a system table for storing integrity information for the audit database; and a keystore for storing integrity information for the system table, wherein the keystore includes application program interface logic for accessing the keystore.

55. The data structure of claim 54, wherein the audit database is a relational database.

56. The data structure of claim 54, wherein the system table stores an integrity value for each of the at least one auxiliary database.

57. A computer program in a computer readable medium for creating an event record in an audit subsystem in a data processing system, comprising:

instructions for creating a new record in an audit data structure;

instructions for receiving a new serial number value from a system data structure;

instructions for storing the next serial number value in the new record of the audit log data structure;

instructions for incrementing the next serial number value in the system data structure;

instructions for calculating an integrity value for the new record of the audit log data structure;

instructions for storing the integrity value in the new record of the audit log data structure;

instructions for calculating a system integrity value for the system data structure; and instructions for storing the system integrity value in the system data structure.

58. A computer program product in a computer readable medium for creating an on-line integrity check of an audit subsystem in a data processing system, comprising:

instructions for ogging into a keystore;

instructions for receiving database credentials from the keystore;

instructions for accessing an audit database using the database credentials, wherein the audit database includes an audit log table;

instructions for querying the audit log table for a range of serial numbers;

instructions for receiving a results table or audit records in response to the query; and instructions for performing an integrity check on the audit records in the results table.

* * * * *

UNITED STATES PATENT AND TRADEMARK OFFICE
CERTIFICATE OF CORRECTION

PATENT NO. : 6,725,240 B1
DATED : April 20, 2004
INVENTOR(S) : Asad et al.

It is certified that error appears in the above-identified patent and that said Letters Patent is hereby corrected as shown below:

Column 12,
Line 67, after "key" delete "system".

Column 13,
Line 3, after "integrity" insert -- value --.
Line 9, after "audit" insert -- log --.
Line 18, after "log" insert -- data --.
Line 28, after "further" delete "comprises:" and insert -- comprising: --.
Line 56, after "audit" delete "data structure; and" and insert -- log data structure; --.

Column 14,
Line 1, after "log" insert -- data --.
Line 3, after "audit" delete "structure." and insert -- database. --.

Column 15,
Line 23, delete "and".
Lines 30, 33, 35, 39, 44, 48 and 51, after "The" delete "method" and insert -- apparatus --.
Line 45, after "audit" insert -- record --.
Lines 46-47, after "data" delete "structure are stored as tables in an audit database." and insert -- item in the audit record. --.

Column 16,
Line 1, before "the next serial" delete "increasing" and insert -- incrementing --.
Line 6, before "data" insert -- log --.
Lines 17-19, after "from the" delete "database credentials, wherein the audit database includes an audit log table;" and insert
-- keystore;
  accessing an audit database using the database credentials, wherein the audit database includes an audit log table; --.
Line 27, after "check" delete "in" and insert -- on --.

UNITED STATES PATENT AND TRADEMARK OFFICE
CERTIFICATE OF CORRECTION

PATENT NO. : 6,725,240 B1
DATED : April 20, 2004
INVENTOR(S) : Asad et al.

It is certified that error appears in the above-identified patent and that said Letters Patent is hereby corrected as shown below:

<u>Column 17,</u>
Line 14, after "audit" insert -- log --.
Line 16, after "receiving a" delete "new" and insert -- next --.

<u>Column 18,</u>
Line 8, after "medium for" delete "creating" and insert -- performing --.

Signed and Sealed this

Third Day of January, 2006

JON W. DUDAS
*Director of the United States Patent and Trademark Office*